United States Patent [19]
Kuwertz et al.

[11] 3,949,192
[45] Apr. 6, 1976

[54] AIM CONTROL ARRANGEMENT FOR CONVEYOR INSTALLATIONS

[75] Inventors: Erich Kuwertz, Pirmasens, Germany; André Krauth, Bitche, France

[73] Assignee: Pfalzstahlbau GmbH, Pirmasens, Pfalz, Germany

[22] Filed: Sept. 30, 1974

[21] Appl. No.: 510,151

[30] Foreign Application Priority Data
Oct. 4, 1973 Germany............................ 2349848

[52] U.S. Cl. ........................... 235/61.11 E; 198/38
[51] Int. Cl.² .................. G06K 7/10; B65G 43/00
[58] Field of Search .............. 235/61.11 E, 61.11 D, 61.11 A, 235/61.11 C, 61.12 M, 61.12 N; 198/38

[56] References Cited
UNITED STATES PATENTS

| | | |
|---|---|---|
| 3,074,353 | 1/1963 | Devonshire et al. ......... 235/61.12 M |
| 3,317,714 | 5/1967 | Hausler et al. ................ 235/61.12 R |
| 3,751,640 | 8/1973 | Daigle et al. ................. 235/61.11 E |
| 3,784,791 | 1/1974 | Pease ........................... 235/61.11 E |

FOREIGN PATENTS OR APPLICATIONS
801,189   9/1958   United Kingdom.......... 235/61.11 C

*Primary Examiner*—Daryl W. Cook
*Attorney, Agent, or Firm*—Robert H. Jacob

[57] ABSTRACT

Aim control arrangement for conveyor installations of the type having coding cards coordinated to individual carriages that work together with address questioning stations of the conveyor installation comprising a chain guiding rail, a running rail for said carriages, a pulling chain guided by said chain guiding rail, an address carrier frame for each carriage in which the coding card is received, an adjusting insert in said frame operative to adjust the height of the coding card in the proximity of the address questioning stations for cooperation with corresponding means.

8 Claims, 6 Drawing Figures

FIG. 1

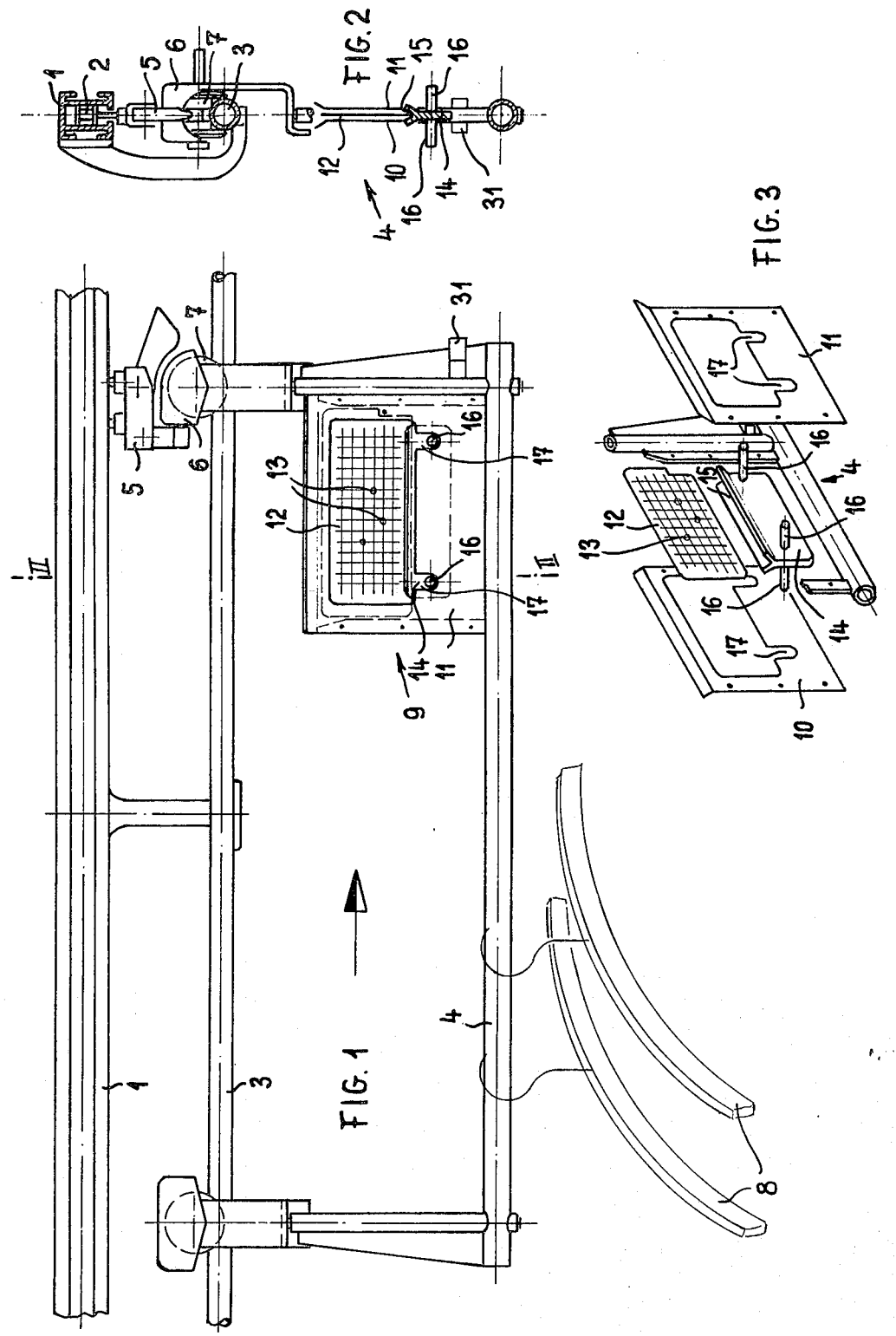

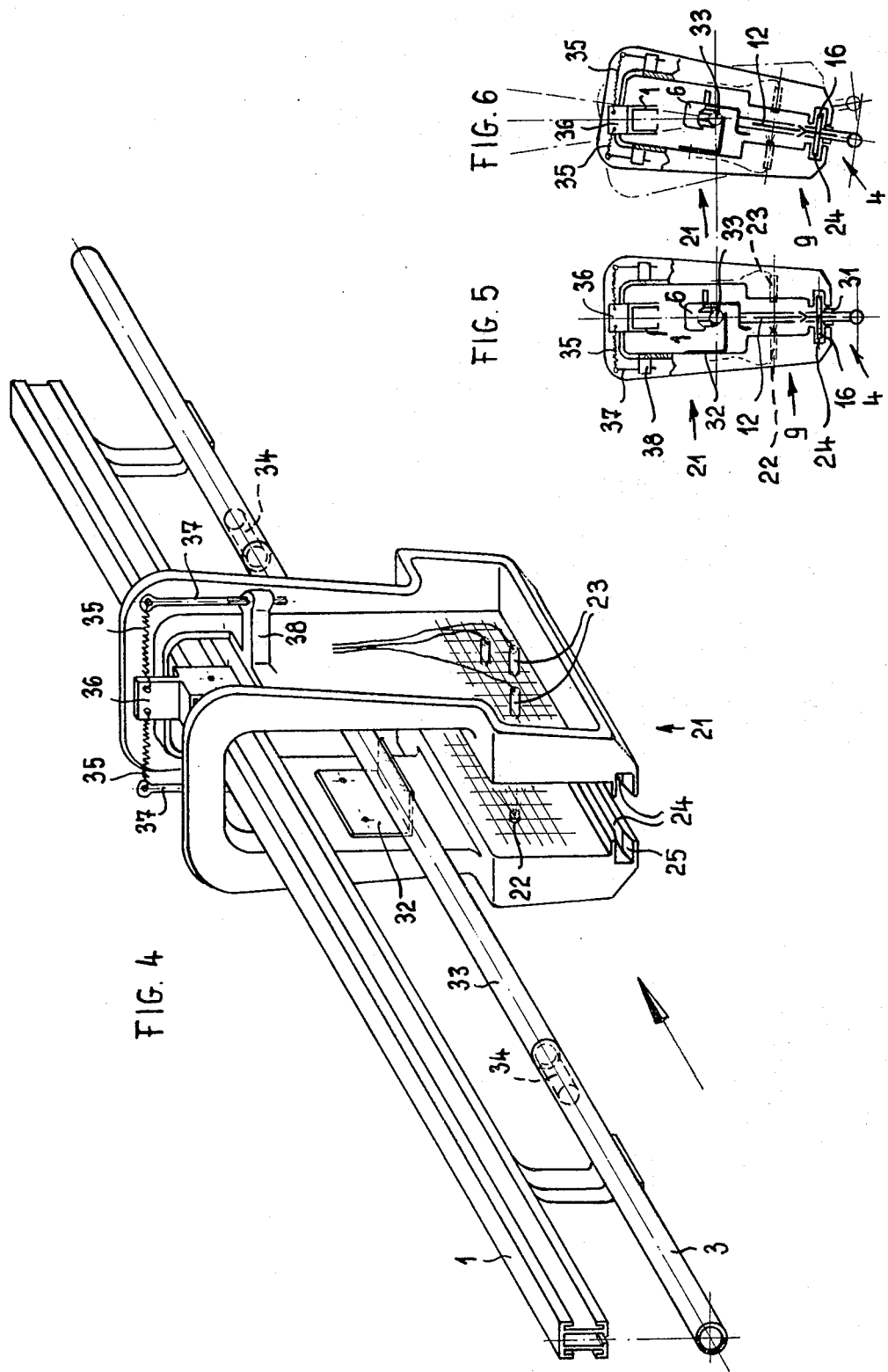

AIM CONTROL ARRANGEMENT FOR CONVEYOR INSTALLATIONS

The invention concerns an aim control arrangement for conveyor installations where coding cards are inserted which coact with the particular address questioning stations in the conveyor installation.

It has been found that aim control arrangements of this type that are made to accompany the individual carriages in the conveyor system can be deployed at relatively little expense and with good success. The known principle exists essentially in that a coding card in the carriage is provided with a combination of perforations and the address questioning stations in the conveyor system are equipped with light barriers, each of which consist of a sender and a receiver (light sources and photoelectric cells) that are arranged opposite one another and can be varied in their arrangement. The forward edge of the coding card or also of the address carrier for the coding card that is forward in the advancing direction first cut in the address questioning station by way of a light switch barrier provided in that location so that its electronic reading means are ready to operate as the perforated card comes in. It is likewise possible with a reflex light barrier and a reflex foil on the carriage or on the coding card to switch on the reading electronic means. The questioning of the coding card takes place as it passes by.

It has been found however, that for the safe operation of this system it is necessary to take care that the coding cards in the area of an address questioning station are flawlessly aligned so that no faulty control impulses can occur. Without adjustment of the coding card no flawless release of perforated cards is possible due to the production tolerances that cannot be avoided.

Accordingly, it is an object of the invention to so construct the address carrier in the carriage on the one hand and the address questioning station in the conveyor installation in such a manner, that in the area of the address questioning station the coding card guided by the same always maintains the same adjusted position with respect to the address questioning station.

This problem is solved in accordance with the invention by an adjusting insert in the address carrier for the coding card that in cooperation with corresponding coacting means in the address questioning stations a positioning of the coding cards in the area of the address questioning stations always takes care of an ever equal and exact positioning.

Advantageously this adjusting insert is equipped at its upper edge with a horizontal V-groove in which the coding card rests loosely with its lower edge and is furthermore equipped with horizontal laterally projecting pins which for one thing slide in vertical guiding slots of the frame of the address carrier and in addition are guided in horizontal guiding grooves in the region of the address questioning stations.

These guiding grooves are advantageously expanded in funnel shape at their entrance side in order to facilitate the introduction of the pins of the adjusting insert.

The positioning (height adjustment and horizontal alignment) in most cases results in safe functioning and aids in the ascertaining of the aiming at the desired target. However, the case may arise where a carriage pendulates or hangs obliquely on the running rail due to laterally suspended or otherwise unevenly applied loads. Then care would have to be taken again in order to avoid faulty controls that between the coding card in the address carrier and the elements of the address questioning station parallel alignment exists. Otherwise displacements in the relative positional height of the perforations in the coding card to the light barrier elements in the address questioning station can again occur which likewise can result in faulty guidance.

In order to meet also this partial problem, it is proposed in further developing the aforementioned and explained inventive concept to arrange the address questioning station pivotably about the running rail. If the carriage with the address carrier enters the address questioning station in the event that the carriage has a predetermined oblique position with respect to the running rail it assumes a predetermined position. Accordingly carriage and address questioning station are also exactly parallel under these conditions. For supporting the possibility of pivotably swinging movement to be provided by the carriage or at the address questioning station the carriage may be provided with a guiding element that will enter in the area of the guiding groove of the address questioning station and release the pivoting movement thereof.

The address questioning station in this connection will advantageously be under the resetting force of two resetting springs which on the one hand are secured to the address questioning station, on the other hand to a fixed point of reference, for example, a buck on the chain guiding rail of the installation.

The address questioning station proper is journalled by means of an angular console to a rail member of the running rail which is by means of studs introduced in the neighboring rail areas and is pivotably supported on these studs. The center axis of the tubular running rail is the common pivot axis of the carriage and questioning station.

In the following specification the invention is described by way of example with reference to the accompanying drawings in a schematically illustrated embodiment of the subject of the invention.

FIG. 1 shows the carriage in a conveyor installation together with the address carrier, FIG. 2 is a section taken along line II—II in FIG. 1, FIG. 3 is a schematic view of the address carrier of the carriage divided up in parts, FIG. 4 likewise illustrates an embodiment of the address questioning station, FIG. 5 is a cross-section therethrough, and FIG. 6 shows the same in an oblique position.

The conveyor installation is equipped with a chain guiding rail 1 in which slides a pulling chain 2. In accordance with the requirements made the chain guiding rail 1 shows the advancing track of the pulling chain 2. Below the chain guiding rail 1 a running rail 3 is arranged on which slide rollers 4 that pass through the conveyor installation.

The pulling chain 2 is equipped with catches 5, the manner of operation of which is not subject of the present invention, and which may cooperate with roller caps 6 that cover the rollers 7 of the carriages 4.

The illustrated carriage 4 serves, for example, to receive clothes hooks by means of which the garments to be finished can be moved from one operating station to another within the conveyor installation.

The carriage 4 is furthermore equipped with an address carrier 9 which consists essentially of a frame that is assembled from two registering lateral frame parts 10 and 11 and in which a code card 12 can be inserted which contains the aim control code in the form of perforations 13 by means of which the carriage is guided to the location in the conveyor installation to which it is addressed.

For the safe addressing in the aim control arrangement it is of importance that the perforations 13 in the coding card 12, as related to the questioning elements, always assume the same height in the address questioning station in order to avoid faulty guidance.

For this purpose an adjusting insert 14 is provided in the frame 9, which may slide in the frame 9 in a vertical direction and which on the one hand has a V-groove 15 at its upper edge, in which the coding card 12 comes to rest with its lower edge and is equipped on the other hand with pins 16 that project from both sides, which in a manner to be described cooperate with corresponding arrangements in the particular address questioning stations. Furthermore these guiding pins 16 slide in vertical guiding slots 17 of the frame parts 10.

The address questioning stations 21 are arranged at the desirable or necessary location in the conveyor installation and equipped with questioning devices in the form of light barriers, where on the one side of the advancing track the address carrier 9 that is moved in by carriages 4 is provided with light sources 22 as senders and these are arranged with respect to core cells as receivers 23 in both coordinates of a vertical plane. If a carriage 4 with an address carrier 9 and a coding card 12 slid into the same enters an address questioning station 21, the lateral pins 16 of the adjusting insert 14 are raised by guide grooves 24 provided in the address questioning station to a position of equal height so that the necessary agreement exists between coding perforation 13 on the one hand and the questioning means, for example light barriers, on the other hand. The grooves 24 may be widened in a funnel-like manner at their areas of entrance 25 in order to insure faultless entrance of the guiding pins 16.

Depending on the load of the carriages 4, it may occur that they do not hang perpendicularly on the running rail 3, but assume an oblique position, for example the carriage may be pendulating. This oblique position would again make questionable the aim control certainty that is provided by the aforementioned adjusting possibility of the height location of the coding cards. Accordingly the address questioning stations may be equipped in a manner that they can follow any possible oblique positions of the arriving carriages.

For this purpose the carriages 4 may be equipped at their front end with guiding members 31 which enter, for example, in the area of the groove 24 of the address questioning station 21 and compel an adaptation to the oblique position of the address questioning station to that of the carriages.

In order to make this possible the address questioning station 21 is journalled by means of an angle console 32 upon a rail portion 33 which is rotatably journalled about its axis by means of pins 34 in the neighboring connecting areas of the running rail 3.

In order to make possible the return of the address questioning station into its normal vertical position after a carriage in oblique position has left a station, resetting springs 35 are provided, which on the one hand are secured on a stationary buck 36 on the chain guiding rail 1, and on the other hand on spring supports 37 that are secured to the address questioning stations.

The possibility of rocking or pivotal movement can clearly be seen in FIG. 6.

Having now described our invention with reference to the embodiment illustrated in the accompanying drawings, what we desire to protect by letters patent of the United States is set forth in the appended claims.

We claim:

1. Aim control arrangement for conveyor installations of the type having coding cards coordinated to individual carriages that work together with address questioning stations of the conveyor installation comprising a chain guiding rail, a running rail for said carriages, a pulling chain guided by said chain guiding rail, an address carrier frame for each carriage in which the coding card is received, an adjusting insert in said frame operative to adjust the height of the coding card in the proximity of the address questioning stations for cooperation with corresponding means.

2. Aim control arrangement in accordance with claim 1 where said adjusting insert is provided at its horizontal upper edge with an upwardly open groove of V-shaped cross section.

3. Aim control arrangement in accordance with claim 2 where said adjusting insert presents laterally projecting pins sliding on the one hand in vertical guide slots in the frame of the address carrier and guided on the other hand in horizontal guiding grooves in the area of the address questioning station.

4. Aim control arrangement in accordance with claim 3 where said guiding grooves in the address questioning stations are widened in funnel fashion at their entrance side.

5. Aim control arrangement in accordance with claim 4 where the address questioning stations are mounted for rocking movement about a horizontal axis defined by the running rail.

6. Aim control arrangement in accordance with claim 5 where said carriages comprise a guide member operative to adjust the rocking movement of the address questioning station.

7. Aim control arrangement in accordance with claim 6 comprising an angular console for journalling said address questioning stations on a rail portion of the running rail and pins extending into the neighboring rail portions and are rockably supported about said pins.

8. Aim control arrangements in accordance with claim 7 comprising resetting springs on said address questioning stations secured on the one hand to the address questioning station and on the other hand on a fixed reference point such as a buck on the chain guiding rail.

* * * * *